April 8, 1924.
S. S. FULLER
1,489,318
TRACTION DEVICE
Filed May 3, 1923 3 Sheets-Sheet 1
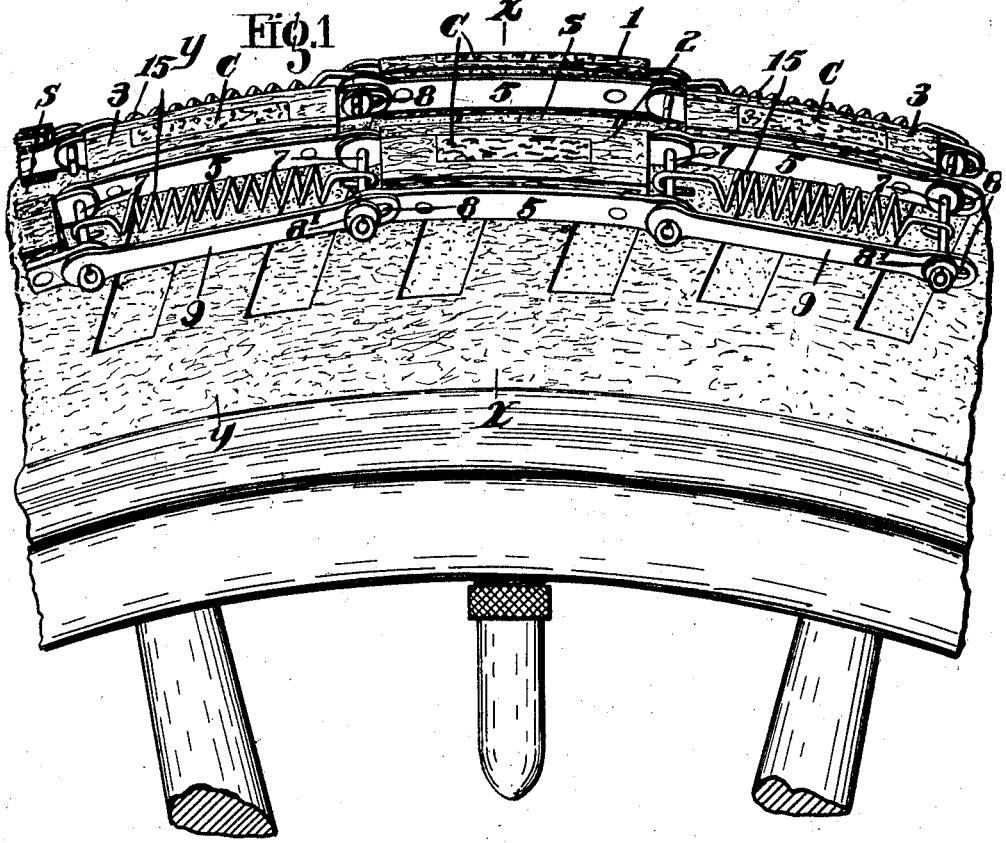
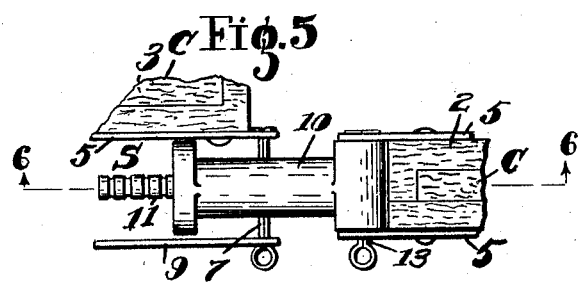
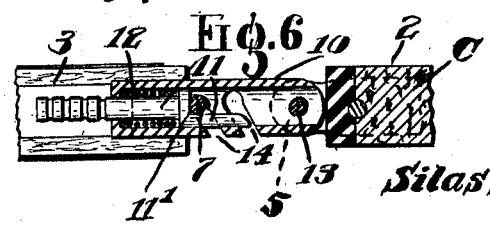
Inventor
Silas Stillman Fuller
By Ellis Spear Jr.
Attorney April 8, 1924.

S. S. FULLER

TRACTION DEVICE

Filed May 3, 1923

Inventor
Silas Stillman Fuller

By Ellis Spear Jr.
Attorney

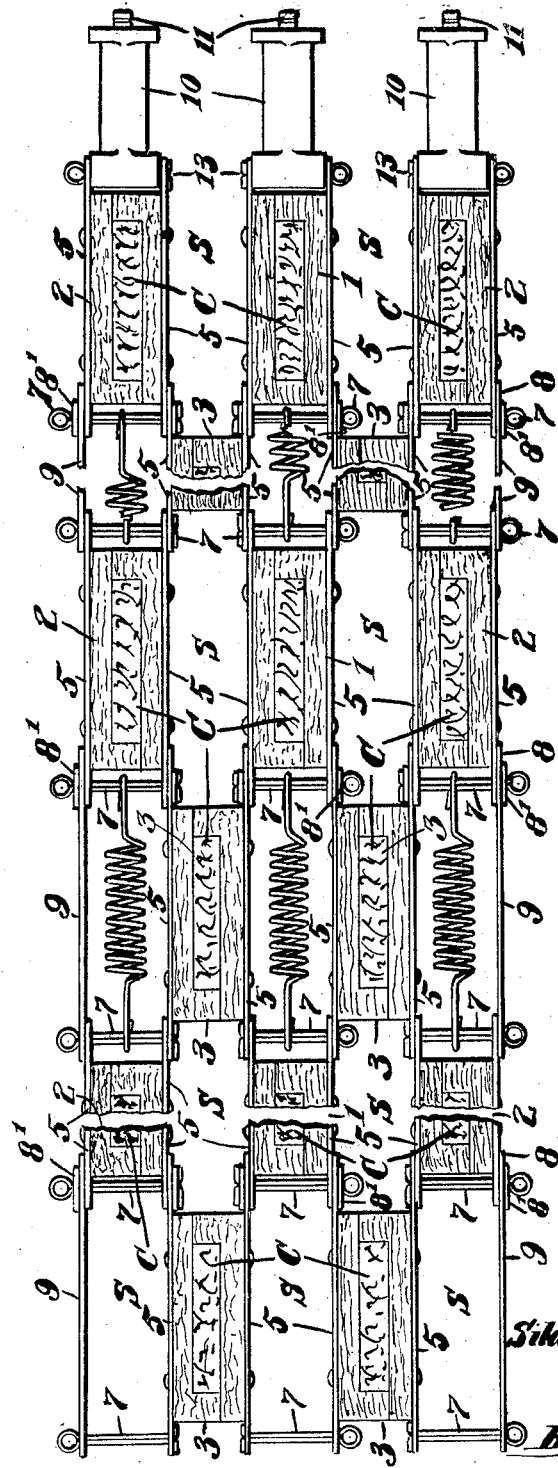

Patented Apr. 8, 1924.

1,489,318

UNITED STATES PATENT OFFICE.

SILAS STILLMAN FULLER, OF BOSTON, MASSACHUSETTS.

TRACTION DEVICE.

Application filed May 3, 1923. Serial No. 636,383.

*To all whom it may concern:*

Be it known that I, SILAS STILLMAN FULLER, a citizen of the United States, residing at Boston, county of Suffolk, State of Massachusetts, have invented certain new and useful Improvements in Traction Devices, of which the following is a specification.

My present invention relates to traction devices and is particularly applicable to such a band as is disclosed in my prior Patent No. 1,431,517, of October 10, 1922, and involves certain novel features in such bands as well as certain improvements in the structure therein shown. For the purpose of illustrating the invention herein involved I will show a band of the same general type as that involved in my prior patent but with the novel features and improvements mentioned.

In general, it is to be understood that for such a traction device as this band I provide improved means for permitting the band as a whole to accommodate itself to the tire or other surface to which it is applied and to maintain its position thereon. I have also improved the structure of my tread units by which their efficiency is greatly increased. I furthermore provide novel connecting means by which such device may be applied to a tire or the like in the form of an endless band with the least possible difficulty in application and with the greatest possible security against accidental detachment or dislodgment. I have also in the form herein illustrated made various improvements in general structure and combination all of which I will more fully discuss in the following specification, reference being had to the accompanying drawings. In these drawings:—

Fig. 1 is a fragmentary view of a portion of a band in accordance with my invention as applied to a tire viewed from a side elevation.

Figure 2:
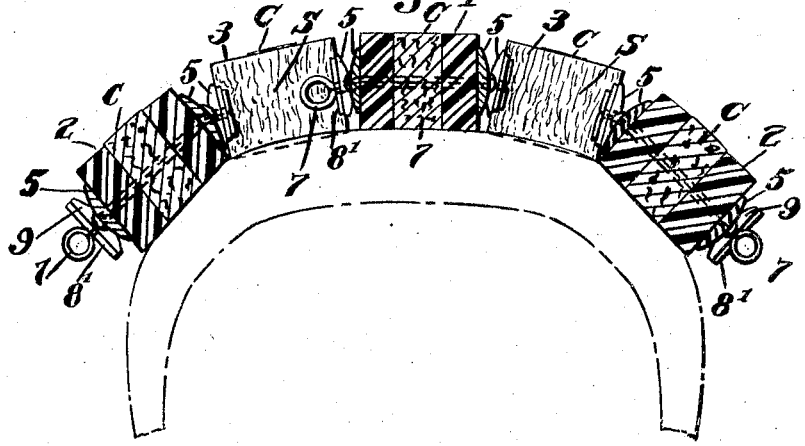
Fig. 2 is a sectional view on the line $x-x$, Fig. 1.
Figure 3:
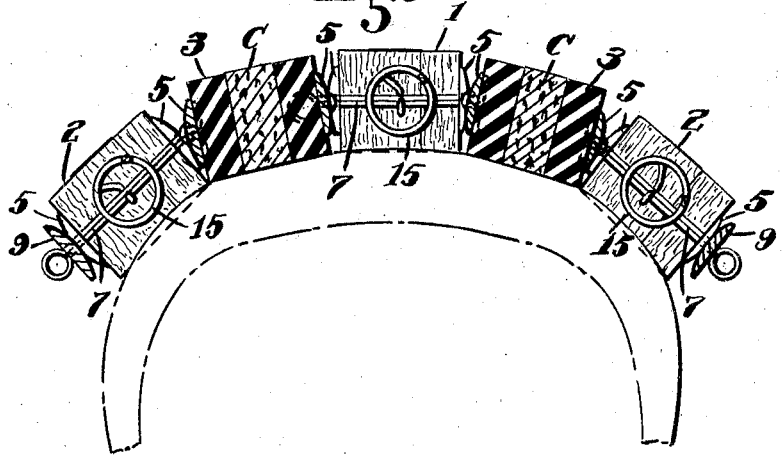

Fig. 3 a section on the line $y-y$, Fig. 1.

Fig. 4 a plan view of a portion of such band laid flat, and

Figs. 5 and 6 details of one of my spring catches.

In general the traction band herein selected may be considered as a series of longitudinal and transverse rows in which there are spaced traction units, the traction unit of each row longitudinally as well as transversely alternating with a space and being relatively staggered in the succeeding transverse rows so that each traction unit follows and is followed by a space in the band. As in my prior patent, I preferably employ an odd number of longitudinal rows and for ordinary sizes of tires I find that the band of five links and spaces is most satisfactory. These are preferably arranged as in my prior patent with a central unit 1 and a pair of lateral units 2 with spaces S between them, constituting one transverse row and linked thereto is the next or following row of two units 3, the band being completed at its outer edge by connecting links 9.

There are preferably an odd number of these transverse rows so that alternate end links including the marginal end links or members at one end of the band may be provided with a spring fastening device capable of projection within the space S of the end row in the opposite end of the band.

These spring connecting devices while capable of varied structure, I preferably form as cylindrical casings 10 having a central bore in which is a plunger 11 normally held in by a spring 12. The stem 11 extends preferably slightly beyond the outer end of the casing, the opposite end being pivoted as at 13 between the side links 5 of the three traction units.

The casing has a diagonal slot or kerf 14 which intersects the bore of the casing, its inclination being directed somewhat towards its pivoted end so that when hooked over the transverse fastening 7 of the opposite links will tend to seat itself thereon. The plunger 11 has its end undercut at $11^1$ and constitutes a latch by which the member 7 is confined in the slot. When so connected as shown in Figs. 5 and 6, the ends of the casing and the extended stem 11 lie between the adjacent traction units so as to be protected thereby while freely working within the same each time the band is flexed.

My traction units 1, 2 and 3 are all substantially of the same construction. They each may be considered as comprising a pair of side links 5 between which are clamped a laminated filling preferably consisting of cork and rubber as set forth in my prior patent.

I prefer, however, to construct this laminated filling by making the external or rubber layers with a slight extension at each end. This gives to them a somewhat of an L-shape and by reversing these layers I form a space between them within which the cork insert C may be held, compressed and protected. The end extensions covering the ends of the cork insert protect the cork which would otherwise have a tendency to wear away on its corners.

In practice the outer layers which are of some compressible material like rubber or fibre with the cork between them and with the links enclosing is brought to a considerable state of compression and the links firmly riveted before the compression is released. This gives to the links a very considerable durability and a very high traction efficiency, while at the same time retaining in large part the cushioning character of the unit as a whole.

In my present structure I have shown the transverse connecting members 7 as ordinary cotter pins. These pins seem for practical purposes to be adequate and are of course convenient members as they are readily removable and replaceable and readily obtained almost anywhere.

In order to provide for the marginal shortening of the band to make it conform to the usual tire and to keep it in place thereon I preferably slot one end of various of the connecting links 5 as indicated at 8 employing a small washer 8¹, below the head of the cotter pin 7. This may be done on any desired number of the transverse rows, it being desirable of course that the distribution of these adjusting links should be symmetrical along the length of the band. Wherever such lateral links are slotted I provide a spring 15 hooked at each end of the adjacent pins 7 thereby making a resilient take up of the slotted link. These springs being disposed between adjacent tread units and somewhat below the tread surfaces thereof do not receive any particular wear and in practice seem to accommodate themselves to mud, snow or dust from which they free themselves by their own resiliency.

While I have discussed preferred structure somewhat in detail it will be understood that various modifications may be made without departing from the spirit of my invention as defined by the claims drawn thereto, although I find that many of the specific improvements that I have made are important and add materially to the general success of the whole.

What I therefore claim and desire to secure by Letters Patent is:—

1. In a traction band, a plurality of connected rows of spaced traction units, each unit including a pair of spaced rigid side links and a filling, the ends of said links extending beyond the ends of said filling and pivoted to the ends of adjacent preceding and succeeding links, some of said pivoted ends including slotted connection, and tension springs connecting peripherally adjacent links adjacent said slotted connection.

2. In a traction band, a plurality of connected rows of spaced traction units each unit consisting of a pair of spaced rigid side links and an interposed filling between said links, the ends of said links extending beyond the ends of said filling and pivoted to the ends of adjacent preceding and succeeding links, some of said pivoted ends being yieldably pivoted and resilient members connecting peripherally adjacent links.

3. In a traction band, a unit link comprising a pair of rigid side links and an interposed filling consisting of a pair of units disposed in enclosing relation, and a cork central insert, said entire filling being held under compression by said spaced rigid side links.

4. In a traction band, a unit link comprising a pair of rigid side links and an interposed filling comprising an enclosing member and a cork central insert, said entire filling being held under compression by said spaced rigid side links.

5. In a traction band, a unit link comprising a pair of rigid side links and an interposed filling consisting of a pair of L-shaped lateral rubber units disposed in reversed relation to form an enclosing member and a cork central insert, said entire filling being held under compression by said spaced rigid side links.

6. A traction band comprising rows of traction members, the traction members of each row alternating with a space and the traction members of each row being in staggered relation to those of the next adjacent row, and fastening members on the ends of the traction units at one end of the band and adapted to engage the opposite end of the band between the traction units thereof so as to be protected thereby.

7. A traction band comprising a central row of longitudinally spaced traction units and a row of longitudinally spaced traction band units disposed on either side of said central row and spaced therefrom transversely of the band, each unit consisting of a pair of spaced rigid side links and a filling fastened between said links, the ends of said side links extending beyond the ends of said fillings, a plurality of transversely disposed fastenings pivotally engaging the extensions of said links, and a plurality of snap engaging members pivoted to the one end of said rows and engageable with the transversely disposed fastenings at the opposite end of said rows.

In testimony whereof I affix my signature in presence of two witnesses.

SILAS STILLMAN FULLER.

Witnesses:
VICTORIA LOWDEN,
MARIAN F. WEISS.